(12) United States Patent
Zink

(10) Patent No.: US 6,807,289 B2
(45) Date of Patent: Oct. 19, 2004

(54) METHOD TO COMPENSATE FOR PATTERN DISTORTION ON SHEET-TYPE WORK MATERIAL SPREAD ONTO A SUPPORT SURFACE

(75) Inventor: Andrew Zink, Stafford Springs, CT (US)

(73) Assignee: Gerber Technology, Inc., Tolland, CT (US)

( * ) Notice: Subject to any disclaimer, the term of this patent is extended or adjusted under 35 U.S.C. 154(b) by 530 days.

(21) Appl. No.: 09/928,145

(22) Filed: Aug. 10, 2001

(65) Prior Publication Data

US 2003/0031384 A1 Feb. 13, 2003

(51) Int. Cl.[7] .............................. G06K 9/00; G06K 9/40; G06K 9/32; B26D 5/20; G06F 19/00
(52) U.S. Cl. ..................... 382/111; 382/275; 382/293; 83/76.1; 700/134
(58) Field of Search ................................. 382/111, 215, 382/294, 275, 293, 170, 295; 83/56, 76, 75, 76.6, 76.1; 700/135, 131, 134

(56) References Cited

U.S. PATENT DOCUMENTS

| | | | |
|---|---|---|---|
| 4,961,149 A | 10/1990 | Schneider et al. | |
| 5,172,326 A | 12/1992 | Campbell, Jr. et al. | |
| 5,353,355 A | 10/1994 | Takagi et al. | |
| 5,487,011 A | 1/1996 | Chaiken | |
| 5,508,936 A | 4/1996 | King et al. | |
| 6,192,777 B1 | * 2/2001 | Williams et al. | 83/56 |
| 6,741,732 B2 | * 5/2004 | Yui | 382/144 |

\* cited by examiner

*Primary Examiner*—Jon Chang
*Assistant Examiner*—Wes Tucker
(74) *Attorney, Agent, or Firm*—McCormick Paulding & Huber LLP

(57) ABSTRACT

In a method for compensating for pattern distortion of sheet-type work material spread onto a support surface a processing apparatus is provided and carries said support surface. The work material is spread onto the support surface and images of selected areal portions of the work material are captured. A controller analyzes these images and projects them onto a display whereupon the images are mapped to define any distortion in the work material. The controller then undistorts the images of these areal portions and projects them back onto the display so that an operator can position undistorted digital representations of pattern pieces onto the undistorted images of the work material. The controller then distorts the geometry of the pattern pieces positioned on the work material by the operator to conform to the distortion in the spread material.

15 Claims, 2 Drawing Sheets

METHOD TO COMPENSATE FOR PATTERN DISTORTION ON SHEET-TYPE WORK MATERIAL SPREAD ONTO A SUPPORT SURFACE

FIELD OF THE PRESENT INVENTION

The present invention is generally related to the creation of markers on sheet-type work material, and is more specifically directed to analyzing and compensating for the distortion in patterns defined by said work material as a result of being spread onto a support surface prior to the performance of a work operation.

BACKGROUND OF THE PRESENT INVENTION

The present invention is particularly well suited for use in the creation of markers generally utilized in the production of garments and will be explained in connection with such use. However, the present invention is not limited in this regard as any application wherein pattern bearing sheet material is spread resulting in some distortion of the pattern, such as in the cutting of fabric to upholster furniture, can benefit from the present invention. Accordingly, the following descriptions of the present invention should be considered as illustrative, and not limiting.

In the mass production of garments, one or more layers of fabric are typically spread onto what is referred to by those skilled in the art of fabric processing as a spreading table. The fabric is then moved, often via a conveyor, onto a support surface forming part of a fabric processing apparatus such as cloth cutting machine. During the spreading and subsequent movement of the fabric on to the processing apparatus, some stretching and distortion often occurs. This is especially problematic when the fabric defines a pattern as any pattern pieces cut from the stretched and distorted fabric without compensating for the malformation will likewise have the pattern distorted therein.

Generally, pattern pieces are positioned on the spread fabric in a spatial array of garment segments positioned in a cutting sequence. This spatial array of garment segments is referred to by those skilled in the pertinent art to which the present invention pertains as a "marker." Usually markers are computer generated to optimize piece pattern density and thereby minimize the waste of fabric or other spread material. In the past, computerized marker systems simply generated a marker having fairly large tolerances between adjacent pieces. The spread was first cut such that the pieces to be matched were cut including the aforementioned tolerances. These pieces were then provided to a skilled worker who would manually align the several patterns with the geometric spread design and thereafter re-cut the matched pieces. Spreads that have a geometric pattern such as plaids or stripes also caused difficulty because the clothing designer could specify an alignment of the pattern in several adjacent pieces. As a result, pieces cut from a spread having a geometric design invariably mandate higher costs due to increased waste and the use of slow, skilled labor in the cutting process.

Prior art attempts to perform machine assisted matching whereby a match image overlays a reference image and requires operator assistance to visually align the patterns leads to difficulty in alignment when the bow/skew of the fabric at a reference point is different from the bow/skew of the fabric a point that must be matched to the reference point.

Furthermore, algorithms for automatic pattern matching are well suited to cases when the image to search contains an undistorted version of the image to find. Attempting to account for image distortions in the automatic matching process increases the complexity and time consumption of the matching algorithms. Distortions may also reduce the probability that a matching algorithm will succeed.

Attempts at automatic matching between spread fabric and pattern pieces whereby a match point is restricted to adjustment in only one coordinate direction have also been made. In this instance it is possible for a seemingly correct match point to result in an incorrect adjustment to a marker. To illustrate this problem, reference should be had to FIG. 1, wherein two pattern pieces, a reference piece and a match piece are shown. The match piece is shown in the unmatched position. A picture is taken at reference point "R" on the reference piece, and a subsequent picture is taken at match point "M" on the match piece. A computer processor then analyzes and compares the two images. The objective is to move the match piece so that it matches the pattern defined within the periphery of the reference piece. The automatic matching routine will return point "A", FIG. 1, as the corrected match point for reference point "R". Since the automatic matching routine allows for movement of the match piece in only a single coordinate direction, in this case the direction labeled "X" in FIG. 1, the match piece will be moved in the X direction such that point "M" overlays point "A1". Based on the pattern defined within the periphery of FIG. 1, the correct match point is "A2" and therefore the automatching technique described fails to properly align point "M" with point "R".

Based on the foregoing, it is the general object of the present invention to provide a method for compensating for pattern distortion on sheet-type work material spread onto a support surface that overcomes the problems and drawbacks of prior art methods.

SUMMARY OF THE PRESENT INVENTION

The present invention is directed in one aspect to a method for compensating for pattern distortion on sheet-type work material spread onto a support surface wherein a work material processing apparatus defining the support surface is provided. At least one layer of work material is spread onto the support surface and images of areal portions of the work material in the spread condition are captured via means provided. These means capture images corresponding to the locations where pattern pieces making up markers will be positioned and transmit signals corresponding to the captured images to a controller in communication therewith.

The controller is programmed with the marker configuration, as well as to analyze distortion in the pattern defined by the spread work material. A display in communication with the controller receives signals from the controller and projects images thereon corresponding to those captured. The distortion of the pattern shown in the captured image is then mapped so that the controller can analyze the extent of the distortion thereon. The mapped image of the distorted pattern is then undistorted via the controller and an undistorted image is projected onto the display. Undistorted digital representations of the pattern pieces that will comprise the marker are then positioned by an operator on the undistorted image of the spread work material to align the pattern defined within the boundary of the pattern piece with that corresponding to the image of the spread work material shown on the display. Once the pattern pieces are positioned, the controller operates to distort the geometry defined by the pattern pieces relative to the actual distortion of the pattern defined by the areal portions of the work material upon which the pattern piece is positioned so that when the pattern pieces are cut from the spread work material the pattern contained therein will be undistorted.

In the preferred embodiment of the present invention, the means for capturing an image of the work material when spread onto the support surface is a camera. Preferably, the support surface is approximately flat with the camera coupled to a beam extending transversely across the support surface. The beam is movable, back-and-forth in a direction longitudinal of the support surface with the camera being movable longitudinally along the beam.

DETAILED DESCRIPTION OF THE PREFERRED EMBODIMENT OF THE PRESENT INVENTION

Figure 1:
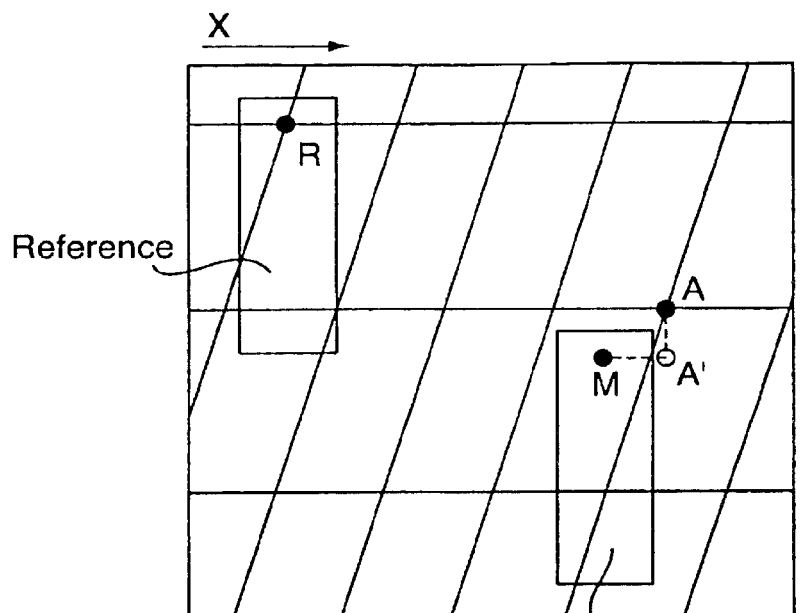
FIG. 1 is a schematic illustration of a prior art method of automatically matching pattern pieces to patterns wherein the pattern piece or match piece can be moved in only a single coordinate direction.
Figure 2:
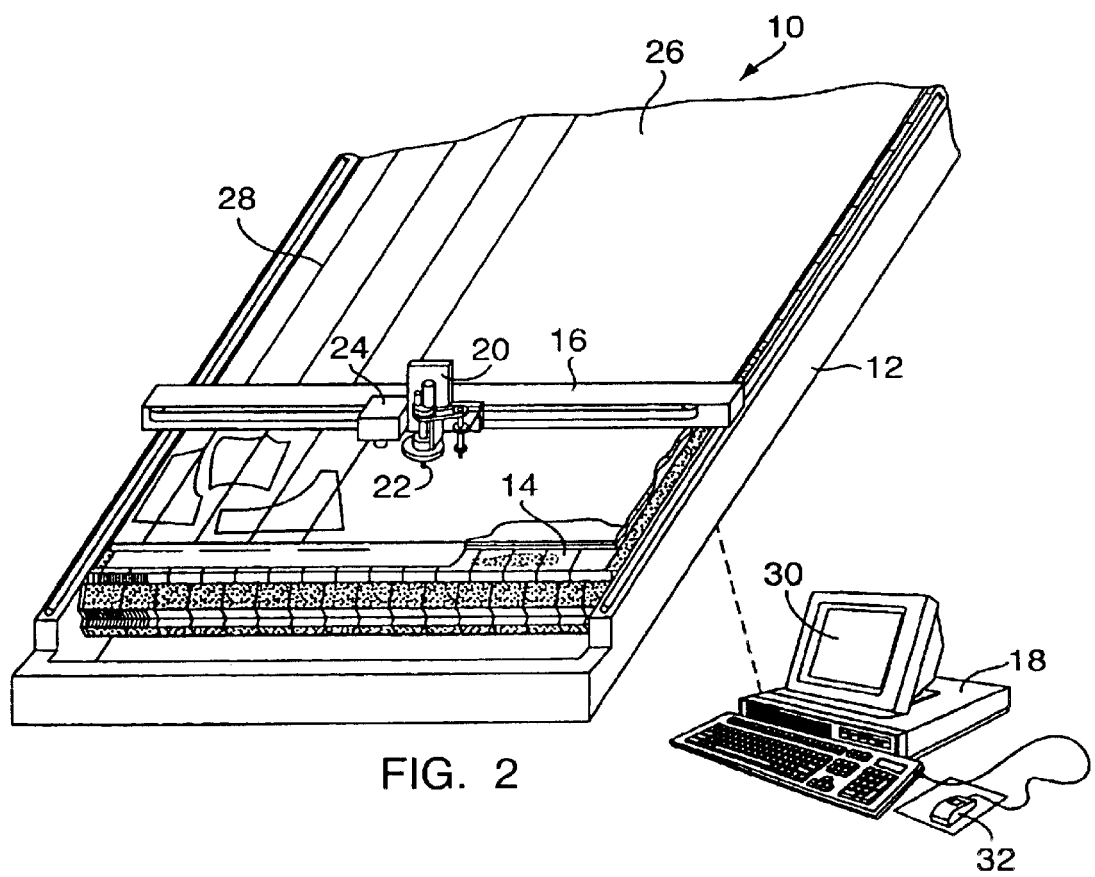
FIG. 2 is a perspective view of a flat bed type cloth cutting apparatus having a layer sheet-type work material defining a pattern thereon positioned on the cutting table.

As shown in FIG. 2 a sheet-type work material processing apparatus generally designated by the reference number 10 and depicted in the illustrated embodiment as a cloth cutting machine defines a frame 12 having a support surface 14 carried thereon. The cutting machine 10 also includes a beam 16 extending transversely across the support surface and moveable back and forth in a longitudinal direction thereof in response to command signals generated and issued by a controller 18 in communication with a cutting apparatus. A cutting head 20 having a cutting tool 22 such as a reciprocating blade mounted thereon is mounted onto the beam 16 for movement longitudinally thereof also in response to command signals generated and issued by the controller 18.

A camera 24 is attached to the cutting head 20 and moves with it for capturing images of a layer of sheet-type work material 26 defining a pattern 28 thereon. A display 30 shown in the illustrated embodiment as a computer type monitor is in communication with the controller as is the camera 24. While the controller 18 has been shown in the illustrated embodiment as a PC type computer, the present invention is not limited in this regard as any type of controller capable of being programmed to receive signals from a camera, or sensors in general, and to send the image received to a display such as a programmable logic controller can be substituted without departing from the broader aspects of the present invention. In addition, while a computer type monitor has been shown and described in the illustrated embodiment the present invention is also not limited in this regard as any type of display device capable of displaying an image of areal portions of the spread work material such as a screen housed in a control panel can be substituted without departing from the broader aspects of the present invention.

The controller 18 is programmed to operate the beam 16 and the cutter head 20 to move them across the surface of the work material 26 carried by the support surface 14 so as to carry out both image capturing and cutting operations. In addition, the controller is programmed with a series of pattern pieces (not shown) which collectively define a marker. Furthermore, the controller is also programmed to map the pattern distortion defined by the work material 26 spread onto the support surface 14 and to undistort, as will be explained in detail herein below, the pattern.

During a marker generating operation, the beam, the cutter head 20, and thereby the camera 24 are moved over the surface of the work material 26 spread onto the support surface 14 and images of areal portions of the spread work material corresponding to locations where pattern pieces defining the marker will be positioned are captured by the camera. Signals generated by the camera 24 corresponding to these captured images are then received by the controller which in turn generates signals indicative of these images to be displayed on the screen of the display 30.

Figure 3:
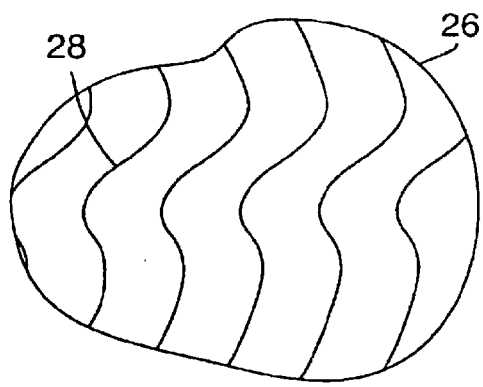
FIG. 3 schematically illustrates a section of the layer of sheet-type work material of FIG. 2 and shows the distortion of the pattern defined by the work material as a result of spreading it on to the cutting apparatus of FIG. 2.

As shown in FIG. 3 the images captured by the camera 24 and displayed on the display 30 illustrate the distortion of the pattern defined by the work material 26 as a result of it being spread onto the support surface 14. This distortion can be in the form of arcuate pattern lines that should be straight as well as the pattern being shifted from the position it should reside in, in an undistorted condition. This is referred to by those skilled in the pertinent art to which the invention pertains as bow and skew. In addition to bow and skew, the work material as a result of being spread onto the support surface 14 can also be stretched in any number of different directions. Accordingly, the width of geometric portions of the pattern can be either narrower, wider, or of varying dimensions from that as would be expected in the undistorted conditions. Accordingly, the pattern distortion can make it extremely difficult for an operator to appropriately match, for example, pattern pieces that make up a marker for a particular garment wherein the garment designer has specified definite pattern orientations for each pattern piece relative to the other.

Figure 4:
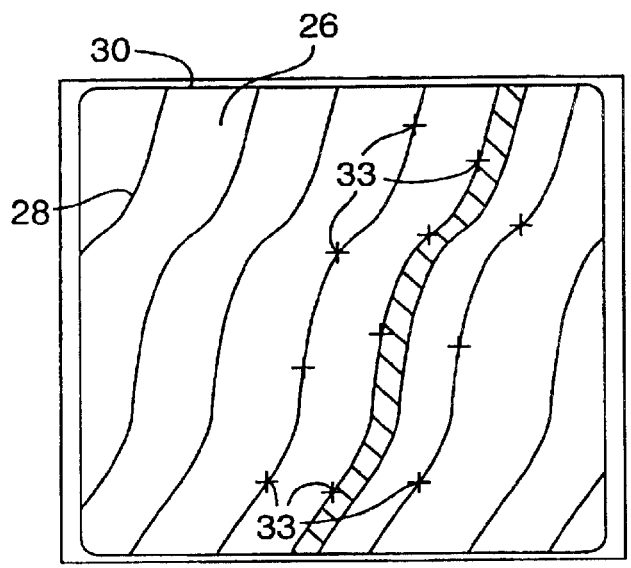
FIG. 4 shows the section of the work material of FIG. 2 with operator defined mapping points positioned along the distorted pattern.

As shown in FIG. 4 prior to positioning any digital representations of pattern pieces as will be explained in detail below, the distortion of the pattern in the areal portions of the spread work material 26 captured by the camera 24 is mapped. Mapping is accomplished by an operator using a pointing device 32 such as, a mouse to position reference points on the displayed image of the distorted areal portion of the work material 26 along the various geometric elements that define the particular work material pattern. These mapped reference points are then analyzed by the programmed controller 18 so that the pattern distortion is defined and can be manipulated. This pattern distortion is then analyzed by the controller and an undistorted pattern image is displayed on the display 30.

Figure 5:
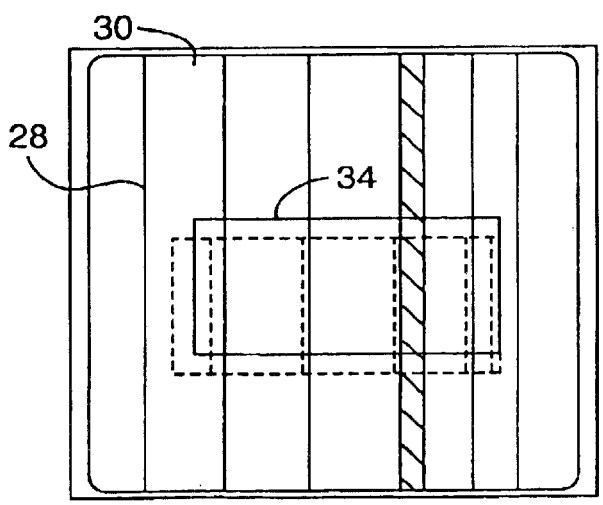
FIG. 5 schematically illustrates the pattern shown in FIGS. 2 and 3 in an undistorted condition and having a digital representation of an undistorted pattern piece positioned thereon.

As shown in FIG. 5 the operator can then manipulate again via a pointing device such as a mouse, a digital image of a pattern piece 34 defining the above described marker on the undistorted image displayed on the monitor so that a near perfect match between the pattern required by the pattern piece 34 and the undistorted image of the spread pattern defined by the spread work material can be made. The position of the pattern piece 34 can then be fixed. This process continues until each pattern piece requiring a match, is positioned appropriately. At this point the controller 18 then causes the geometry defined by the individual pattern pieces 34 to be distorted in accordance with the distortion mapped in the areal portions of the spread work material 26 wherein these pattern pieces are positioned. The cutting apparatus can be operated to cut the distorted shape of each pattern piece from the spread work material 26 such that when the pattern pieces are removed and the distortion resulting from the spreading of the work material is no longer a factor, the cut pattern pieces will define the geometry and pattern orientation appropriate therefor.

Furthermore, since the manipulation of the digital representations of the spread images 34 as shown in FIG. 5 is being accomplished on a display screen, the image is defined by pixels. The distance between successive pixels is known. As the spread is undistorted according to the aforementioned process and displayed on the screen 30, the discrete nature of the pixels can result in aliasing. To compensate for this, a technique known as Goraud shading is employed. This technique basically blurs the image point between pixels so that a jagged image is not produced but rather one having a smooth appearance.

While preferred embodiments have been shown and described various modifications and substitutions may be made without departing from the spirit and scope of the invention. Accordingly, it is to be understood that the present invention has been described by way of example and not by limitation.

What is claimed is:

1. A method for compensating for pattern distortion on sheet-type work material spread onto a support surface, said method comprising the steps of:
    providing at least one layer of sheet-type work material defining a pattern thereon;
    providing a work material processing apparatus having a frame and a support surface carried by said frame;
    spreading said work material onto said support surface;
    providing means for capturing images of areal portions of said work material when spread onto said support surface;
    providing a controller programmed to analyze distortion in said pattern defined by said work material, said controller being in communication with said means for capturing an image of said work material;
    providing a display in communication with said controller;
    capturing images of said areal portions of said work material spread on said support surface and transmitting said images to said controller;
    projecting said images onto said display based on signals transmitted from said controller;
    mapping the distortion of said pattern defined by said areal portions of said spread work material;
    causing said controller to undistort said images of said areal portions and projecting undistorted images of said areal portions onto said display;
    positioning undistorted digital representations of pattern pieces onto said undistorted images of said work material; and
    causing said controller to distort geometry defined by said pattern pieces to correspond to the pattern distortion of said areal portions of said work material so that when said pattern pieces are cut from said spread work material the pattern therein will be undistorted.

2. A method for compensating for pattern distortion on sheet-type work material spread onto a support surface as defined by claim 1 wherein said means for capturing images is a camera.

3. A method for compensating for pattern distortion defined by sheet-type work material spread onto a support surface as defined by claim 1 wherein said step of projecting an undistorted image of said areal portions onto said display further comprises the step of employing Goraud shading to interpolate between adjacent pixels of said areal portions to provide a smooth image.

4. A method for compensating for pattern distortion on sheet-type work material spread onto a support surface as defined by claim 1 wherein said step of operating said controller to undistort said image includes determining the amount of bow and skew in said pattern defined by said work material.

5. A method for compensating for pattern distortions on sheet-type work material spread onto a support surface as defined by claim 1 wherein said step of mapping the distortion further includes providing a pointing device in communication with said controller for positioning reference points along distorted portions of said pattern to provide said controller with a map of said distortion; and wherein
    said step of causing said controller to undistort said image includes analyzing said reference points defined by said pointing device to determine the extent of distortion in said pattern.

6. A method for compensating for pattern distortion on sheet-type work material spread onto a support surface as defined by claim 5 wherein said pointing device is a mouse.

7. A method for compensating for pattern distortion on sheet-type work material spread onto a support surface as defined by claim 5 wherein said pointing device includes a digitizing pen and digitizing tablet.

8. A method for compensating for pattern distortion on sheet-type work material spread onto a support surface as defined by claim 5 wherein said pointing device includes a keyboard.

9. A method for compensating for pattern distortion on sheet-type work material spread onto a support surface, said method comprising the steps of:
    providing at least one layer of sheet-type work material defining a pattern thereon;
    providing a work material cutting apparatus having a frame and a support surface carried by said frame, a beam extending transversally across said support surface and movable back and forth longitudinally there along, a cutting head coupled to said frame for movement longitudinally thereof and a camera mounted to said cutting head;
    spreading said work material onto said support surface;
    providing a controller programmed to analyze distortion in said pattern defined by said work material, said controller being in communication with said camera and said cutting apparatus;
    providing a display in communication with said controller;
    causing said beam and said cutting head to move over said support surface and thereby said work material in response to commands issued from said controller and operating said camera to selectively capture images of areal portions of said work material spread on said support surface and transmitting said images to said controller;

projecting said images onto said display based on signals received from said controller;

mapping the distortion of said pattern defined by said areal portions of said spread work material;

causing said controller to undistort said images of said areal portions and projecting undistorted images of said areal portions onto said display;

positioning undistorted digital representations of pattern pieces onto said undistorted images of said work material; and causing said controller to distort geometry defined by said pattern pieces to correspond to the pattern distortion of said areal portions of said work material so that when said pattern pieces are cut from said work material the pattern therein will be undistorted; and causing said cutting head to cut said pattern pieces in accordance with said distorted geometry from said work materials so that when said pattern pieces are removed from said support surface the pieces and the patterns defined within their boundaries will be undistorted.

10. A method for compensating for pattern distortion defined by sheet-type work material spread onto a support surface as defined by claim 9 wherein said step of projecting an undistorted image of said areal portions onto said display further comprises the step of employing Goraud shading to interpolate between adjacent pixels of said areal portions to provide a smooth image.

11. A method for compensating for pattern distortion on sheet-type work material spread onto a support surface as defined by claim 9 wherein said step of operating said controller to undistort said image includes determining the amount of bow and skew in said pattern defined by said work material.

12. A method for compensating for pattern distortions on sheet-type work material spread onto a support surface as defined by claim 9 wherein said step of mapping the distortion further includes providing a pointing device in communication with said controller for positioning reference points along distorted portions of said pattern to provide said controller with a map of said distortion; and wherein said step of operating said controller to undistort said image includes analyzing said reference points defined by said pointing device to determine the extent of distortion in said pattern.

13. A method for compensating for pattern distortion on sheet-type work material spread onto a support surface as defined by claim 10 wherein said pointing device is a mouse.

14. A method for compensating for pattern distortion on sheet-type work material spread onto a support surface as defined by claim 9 wherein said pointing device includes a keyboard.

15. A method for compensating for pattern distortion on sheet-type work material spread onto a support surface as defined by claim 10 wherein said pointing device includes a digitizing pen and digitizing tablet.

* * * * *